United States Patent [19]

Milan

[11] Patent Number: 5,101,210
[45] Date of Patent: Mar. 31, 1992

[54] SIGNAL DYNAMIC RANGE COMPRESSION APPARATUS AND METHOD INCLUDING CLUTTER ESTIMATION AND REDUCTION

[75] Inventor: John M. Milan, Canoga Park, Calif.
[73] Assignee: ITT Corporation, New York, N.Y.
[21] Appl. No.: 632,152
[22] Filed: Dec. 21, 1990
[51] Int. Cl.⁵ .............................................. G01S 7/34
[52] U.S. Cl. .................................... 342/159; 342/91; 342/203
[58] Field of Search .................. 342/159, 203, 91, 93, 342/162

[56] References Cited

U.S. PATENT DOCUMENTS

| | | | |
|---|---|---|---|
| 3,130,400 | 4/1964 | Washburn | 341/139 |
| 3,187,323 | 6/1965 | Flood et al. | 341/139 |
| 3,509,558 | 4/1970 | Cancro | 341/139 |
| 4,003,052 | 1/1977 | Adelman et al. | 342/159 X |
| 4,381,508 | 4/1983 | Durboraw, III | 342/159 X |

OTHER PUBLICATIONS

M. Skolnik, *Radar Handbook*, McGraw-Hill, 1970, section 5.6 (Gain Controlled Amplifiers), pp. 5-19 to 5-23.
Hiner, F. P., "The L2000, A Remote Radar Signal in Data Processor," Conf: Radar 1977, London, England, Oct. 77, pp. 168-172.

*Primary Examiner*—Gilberto Barrón, Jr.
*Attorney, Agent, or Firm*—Koppel & Jacobs

[57] ABSTRACT

The maximum amplitude of an input signal (IN) is compressed or reduced to a smaller value suitable for operation on the compressed signal (OUT) by a downstream signal processing stage (16) having insufficient dynamic range, ratio of maximum amplitude to root-mean-square (RMS) noise, to accommodate the original input signal (IN). The input signal (IN) is digitally sampled with coarse resolution to generate a correction signal (44) having a waveform which approximates only the large signal components (24) of the input signal (IN). Where the input signal (IN) consists of recurring received radar pulses, the large signals (24) represent clutter. The amplitude of the correction signal (44) is lower than and increases as a predetermined function of the amplitude of the input signal (IN), and is subtracted from the input signal (IN) so that the large signal components (24) are reduced whereas the small signal components (26), which represent desired target information, retain their original amplitude. Time and/or space estimates of the large signals may be stored and updated, and combined with the sampled input to generate the correction signal (44). A threshold is provided such that only input signals have a predetermined maximum amplitude are compressed.

21 Claims, 2 Drawing Sheets

SIGNAL DYNAMIC RANGE COMPRESSION APPARATUS AND METHOD INCLUDING CLUTTER ESTIMATION AND REDUCTION

BACKGROUND OF THE INVENTION

1. Field of the Invention

The present invention relates to an electronic signal compression apparatus for compressing a composite input signal having a large dynamic range into a smaller dynamic range output signal such that only the large signal components, which in received radar pulse signals represent clutter, are selectively compressed while small signals, which represent desired target information, retain their original amplitude.

2. Description of the Prior Art

Linear dynamic range is an important parameter in modern radar and other types of receivers. It is defined as the operating range over which a receiver can linearly process signals, from a minimum level defined by noise or nonlinearities, to a maximum level defined by saturation or generation of nonlinearities. In modern systems, it is particularly important to preserve the capability to process small signals. If the dynamic range between stages of a receiver is not the same (i.e., the dynamic range of a following stage is less than the dynamic range of the preceding stage), as is often the case, matching of the dynamic range is required by compressing the dynamic range of the signal processed by the preceding stage to correspond to the dynamic range of the following stage.

Conventional receivers typically use one of three methods of dynamic range control (handling large signals): gain control, IF cancellation, or limiting. The first two methods are linear while the third is highly nonlinear. Gain control includes automatic gain control (AGC), in which the gain is varied as a function of the signal strength or some other control signal, and sensitivity time control (STC) in which the gain is varied as a function of range or time. IF cancellation or filtering is performed by delaying the received signal from one transmission and subtracting it from the received signal from the subsequent transmission(s). Both finite impulse response (FIR) and infinite impulse response (IIR) filters have been utilized. Limiting is performed by setting a maximum possible signal level in the receiver which is below the maximum amplitude which strong signals may have in previous stages.

Conventional methods of dynamic range control or compression are described, for example, in a textbook entitled *Radar Handbook*, by M. Skolnik, McGraw-Hill, 1970, section 5.6 (Gain Controlled Amplifiers) pp. 5-19 to 5-23.

The conventional methods have significant shortcomings in modern applications. In radar receivers, for example, a key requirement is to maintain detection capability of small signals, which represent desired target information, in the presence of large signals which represent clutter.

Devices based on AGC and STC reduce the gain to maintain large signals within the linear dynamic range of the following receiver stage. An example of an AGC system specifically designed for this purpose is disclosed in U.S. Pat. No. 3,130,400, entitled "PULSE AMPLITUDE COMPRESSION SYSTEM", issued Apr. 21, 1964, to C. Washburn. The main problem with AGC is that the gain reduction also applies to small signals, thereby resulting in an unacceptable reduction in detectability. STC suffers from the same drawback, and is restricted to relatively short ranges (as a function of the system design).

Typical IF cancellers and filters depend on fixed delay lines (e.g., acoustic lines), sampled delay lines (e.g., charge-coupled devices), or analog filters. The shortcomings of fixed delay lines include inflexibility or significant complications to achieve flexibility, and requirements for temperature control to maintain performance over temperature. Sampled delay lines are more flexible, but they also have shortcomings in the areas of dynamic range and temperature control. The impulse response of IIR filters is such that small targets can be masked by the response to large targets. In addition, limiters are not acceptable because the limiting process introduces nonlinearities and other signal anomalies which mask the desired small signals.

SUMMARY OF THE INVENTION

In accordance with the present invention, the maximum amplitude, which is at the top of the dynamic range, of an input signal is compressed to a smaller value suitable for operation on the compressed signal by a downstream signal processing stage having insufficient dynamic range to accommodate the original input signal. The input signal is digitally sampled with coarse resolution to generate a correction signal having a waveform which approximates only the large signal components of the input signal. Where the input signal consists of recurring received radar pulses, the large signals represent clutter. The amplitude of the correction signal is lower than and increases as a predetermined function of the amplitude of the input signal, and is subtracted from the input signal so that the large signal components are reduced whereas the small signal components, which represent desired target information, retain their original amplitude. Time and/or space estimates of the large signals may be stored and updated, and combined with the sampled input to generate the correction signal. A threshold is provided such that only input signals having a predetermined maximum amplitude are compressed.

The apparatus and method of the present invention overcome the difficulties of available signal compression schemes in two major ways. The invention operates over a restricted region of the full dynamic range of the receiver, and it incorporates digital signal processing which is inherently stable in operation.

The present compression apparatus including clutter estimation and reduction operates like a piecewise linear device in that it provides the nominal gain to signals below a predetermined threshold level, and reduced gain or signal reduction for signals above the threshold level. The nominal gain below the threshold level ensures that small signals are not reduced by the apparatus as is the case with AGC and STC. Since the apparatus is piecewise linear, it does not introduce the severe nonlinearities and anomalies associated with limiting. In addition, because the apparatus operates only over the top end of the dynamic range and uses digital signal processing, matching is not critical, the processing is stable with temperature, and the operation of the apparatus is independent of delays between pulses.

These and other features and advantages of the present invention will be apparent to those skilled in the art from the following detailed description, taken together

DETAILED DESCRIPTION OF PREFERRED EMBODIMENT

The goal of the present invention is to achieve the maximum possible dynamic range in a receiver with stages of varying capability. The key to the preservation of dynamic range in accordance with the invention is to operate on large signals such that small signals are unaffected.

Figure 1:
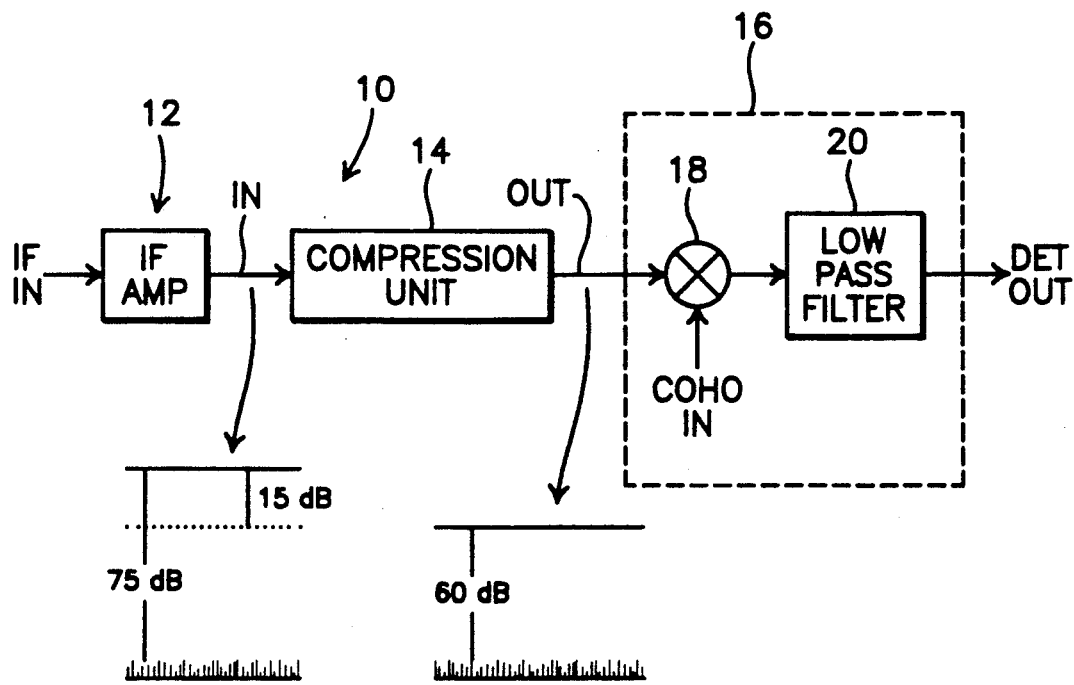
FIG. 1 is a diagram illustrating the operation of the present invention.

As illustrated in FIG. 1, a radar or other type of receiver is generally designated as 10, and includes a intermediate frequency (IF) amplifier 12 for receiving a composite input signal IF IN from a receiving antenna, radio frequency (RF) amplifier stage, and one or more IF mixers (not shown). In a radar receiver, the input signal will consist of recurring pulses modulated with information reflected from targets illuminated by corresponding transmitted pulses. The modulation information includes large signals representing stationary objects, etc. which will be collectively referred to as "clutter." The modulation information also includes small signals representing targets which are desired to be detected. Reduction of the dynamic range of the composite input signal as a whole may result in the loss of the small signals, since they may be reduced below the noise or detection threshold of the receiver.

Typically, RF and IF amplifiers, IF mixers and the like are capable of handling signals with relatively large dynamic range, for example on the order of 75 dB. The dynamic range may be considered to be the maximum signal level or amplitude above the noise level, or the signal-to-noise ratio (SNR) at a given point in the receiver 10. However, other components such as coherent detectors, analog-to-digital (A/D) converters, etc. are only capable of handling signals with relatively smaller dynamic range, for example 60 dB. It is therefore necessary to compress the original composite input signal to a smaller dynamic range to prevent saturation and other undesirable nonlinear operation in the downstream lower dynamic range stages.

As illustrated in FIG. 1, the amplified signal from the amplifier 12 is designated as a composite input signal IN, and is applied to a signal dynamic range compressor 14 embodying the present invention. The compressor 14 compresses the dynamic range of the input signal IN and produces an output signal OUT. The signal OUT is applied to a downstream or subsequent stage of the receiver 10 which is illustrated as being a coherent detector 16, although the invention is not so limited. The detector 16 comprises a coherent mixer 18 which mixes the signal OUT with a coherent local oscillator signal COHO to produce a demodulated output signal, a low pass filter 20, and other components which are not shown to produce an output signal DET OUT which constitutes the information modulated on the reflected pulses by the illuminated radar targets.

For exemplary purposes, it will be assumed that the dynamic range handling capability of the IF amplifier 12 is 75 dB, whereas that of the coherent detector 16 is 60 dB. The input signal IN has a maximum dynamic range, or maximum amplitude above the noise threshold, of 75 dB, whereas the maximum dynamic range of the signal output from the present compressor 14 is 60 dB. The compressor 14 operates on the upper 15 dB mismatch between stages to reduce the dynamic range of the output signal OUT to below a predetermined value corresponding to the maximum dynamic range of the downstream stage, in this case the coherent detector 16.

The compressor 14 will compress any signals having a maximum amplitude corresponding to a dynamic range in excess of 60 dB. However, there need not be a one-to-one relationship between the mismatch range (15 dB) and the compression range. For example, the compression range may be larger than the mismatch range, for example 18 to 24 dB. The lower value (18 dB) generally corresponds to the minimum acceptable reduction to match the requirements of the downstream stage, while the upper value (24 dB) is a design parameter based on the operational range of the compressor 14 and the expected dynamic range of signals which may be simultaneously present. An input signal IN having a dynamic range of 68 dB, for example, may be reduced between 8 and 14 dB.

Figure 2:
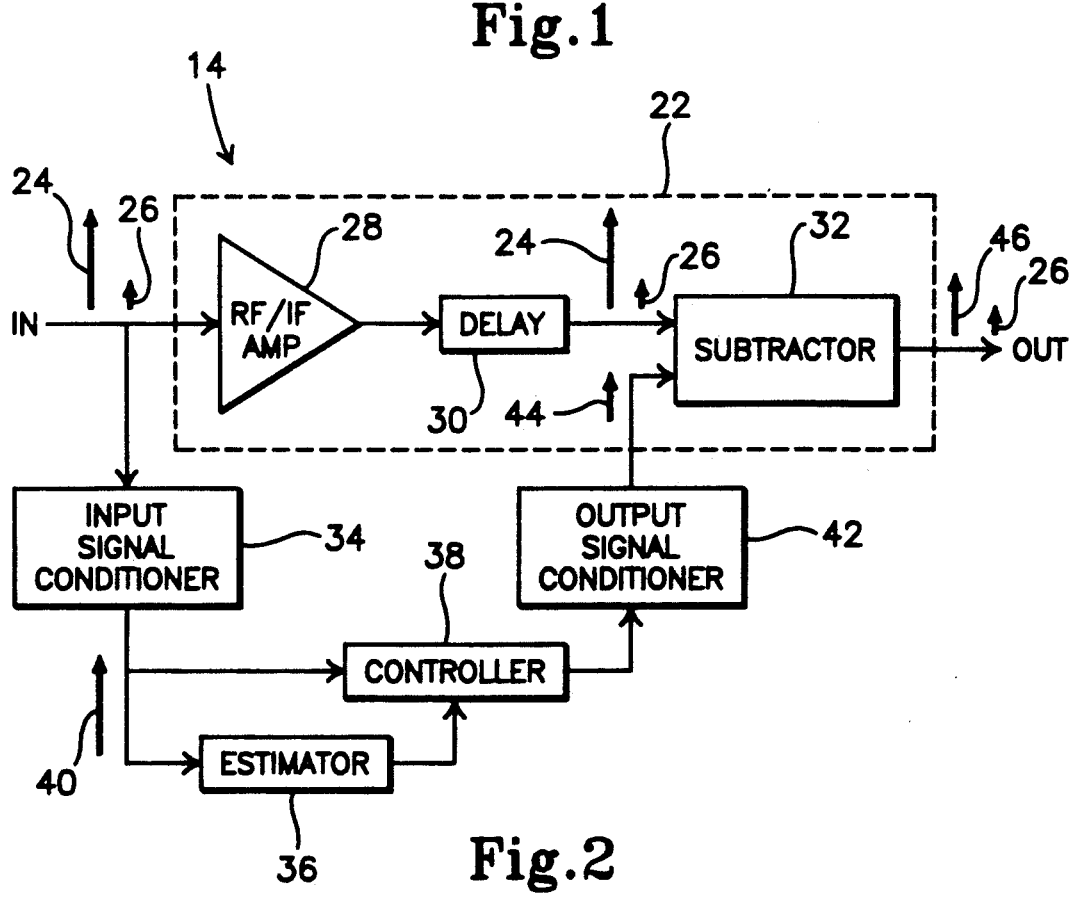
FIG. 2 is a simplified block diagram of a first embodiment of a signal dynamic range compression apparatus embodying the present invention.

Referring now to FIG. 2, the present compressor 14 is illustrated as comprising a combiner 22 which receives the composite input signal IN and produces the output signal OUT. In accordance with an important feature of the present invention, the input signal is symbolically shown as including a large signal vector or component 24 which represents a large clutter signal, and a small signal vector or component 26 which represents a small target signal. Of course, an actual composite input signal may include many large and small signal components. The compressor 14 selectively compresses the input signal IN such that the large clutter signal component 24, having an amplitude in excess of a predetermined value such as 15 dB, is reduced, whereas the small signal component 26, having an amplitude of less than 15 dB, is passed through the compressor 14 without reduction. The compression is performed such that the maximum amplitude of the output signal OUT is reduced to a value below that which corresponds to the dynamic range (60 dB) of the following or downstream stage.

The input signal IN propagates through a nominal signal path in the combiner unit 22 including an amplifier 28 and delay unit 30 to a subtractor 32. The signal IN is also applied through an input signal conditioner 34 to an estimator 36 and a controller 38. The conditioner 34 is constructed to isolate the large signal component 24 by coarsely sampling the signal IN and generating a replica signal 40 in response thereto which approximates only the large signal component 24 of the composite input signal IN.

The controller 38 generates and applies a correction signal through an output signal conditioner 42 to the subtractor 32 as illustrated at 44. The correction signal 44 has a waveform which approximates only the large signal component 24 of the input signal IN, and an amplitude which increases as a predetermined function of the maximum amplitude of the signal IN. The subtractor 32 subtracts the correction signal 44 from the input signal IN to produce the output signal OUT. Since the small signal component 26 is not represented in the correction signal 44, it will not be affected by subtraction of the correction signal 44 from the input signal IN. However, the large signal component 24 will be reduced by subtraction of the correction signal 44 from the signal IN such that the large signal component in the output signal OUT will have a reduced amplitude as illustrated at 46.

In the simplest form of the invention, the estimator 36 may be omitted, and the correction signal 44 derived directly from the sampled replica signal 40. However, provision of the estimator 36 enhances the operation of the compressor 14 by storing averaged time and/or space estimates of the sampled input signal, and updating the estimates with the currently sampled value. The replica signal 40 is combined with the estimates utilizing a suitable algorithm to generate the correction signal in smoothed or averaged form.

The subtractor 32 provides the function of subtracting the correction signal 44 from the input signal IN. However, it is equivalently within the scope of the invention to invert the logical sense of the correction signal 44 prior to application to the subtractor 32, in which case the subtractor 32 will be modified to logically add the correction signal 44 to the input signal IN.

The amplitude of the correction signal must of course be lower than the amplitude of the input signal IN, or the large signal component 46 in the output signal OUT would be inverted with respect to the small signal component 26. The controller 38 and estimator 36, if provided, are constructed to increase the amplitude of the correction signal 44 as a predetermined function of the maximum amplitude of the sampled input signal IN so that the output signal OUT has a maximum amplitude below the value corresponding to the dynamic range (60 dB) of the next receiver stage. The predetermined function may be selected to exactly compress 75 dB into 60 dB, or the compression range (e.g. 18 to 24 dB) may be selected to overlap the interstage mismatch range (15 dB).

The compressor 14 as shown in FIG. 2 is constructed to operate in real time. In this case, the delay unit 30 is provided to delay the input signal IN by a length of time such that the phase thereof will be equal to the phase of the correction signal 44 for operation in the subtractor 32. The equivalent operation is time alignment.

Figure 3:
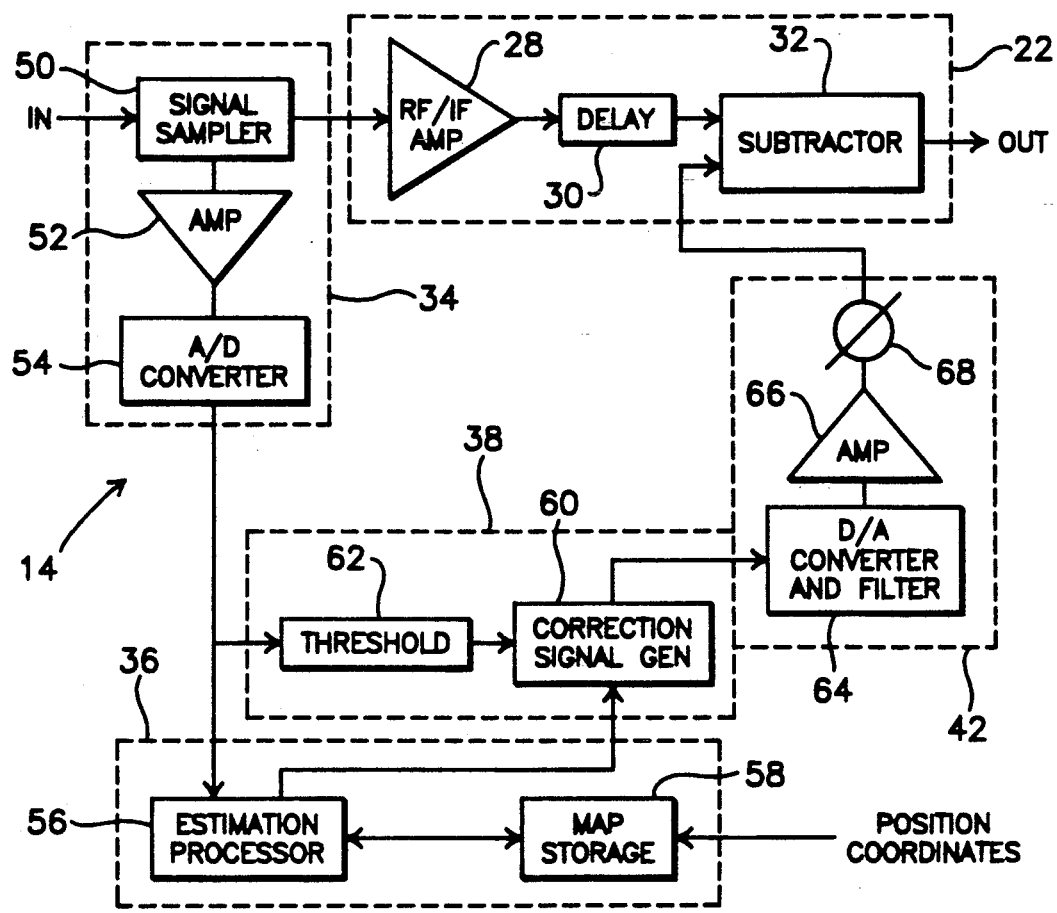
FIG. 3 is a more detailed block diagram of the apparatus of FIG. 2.

The compressor 14 is illustrated in more detail in FIG. 3. The input signal conditioner 34 includes a signal sampler 50 which obtains (via a coupler at RF or other means at other frequencies) a faithful sample of the input signal IN. The output of the sampler 50 is applied to an amplifier 52 which amplifies the sampled signal to match the operating range of an A/D converter 54. The A/D converter 54 produces the coarse replica signal 40 of the sampled input signal IN. The A/D converter 54 is selected to have a number of bits for digitally sampling the input signal with a low resolution selected to ignore, or fail to represent small signals with amplitudes below a predetermined value in the replica signal 40.

Where the input dynamic range is 75 dB and the A/D converter 54 is selected to have four bits (16 digitization increments), signal components with amplitudes below a value corresponding to a dynamic range of 57 dB (each of (n-1) bits of an A/D converter represents approximately 6 dB of dynamic range) will be below the quantization range of the A/D converter 54 and will not be represented in the replica signal 40. Thus, all signal components of dynamic range below 57 dB will be included in the output signal OUT with their nominal amplitudes. The maximum amplitude or dynamic range of signals to be uncompressed, or equivalently the minimum amplitude or dynamic range of signals to be included in the correction signal for compression, may be optimally selected in accordance with a particular application as corresponding to the number of bits in the A/D converter 54. As an alternative, the controller 38 may be modified to synthesize the replica signal 40 from a specified number of high order bit outputs from the A/D converter 54, rather than all of the bit outputs thereof.

The estimator 36 includes an estimation processor 56 and a map storage unit 58. Smoothed or averaged estimates of the replica signal 40 as a function of time and/or space or position are dynamically stored in the storage unit 58, and updated by the estimator 36. Where the compressor 14 is incorporated into a radar receiver, the storage unit 58 may have memory locations corresponding to individual coordinates of the transmitted radar beam in range (time), azimuth (antenna position), and/or elevation (antenna position). The position coordinates are used to access the corresponding memory locations. Each memory location will contain a smoothed estimate of the replica signal 40 (large signal components) at the corresponding set of coordinates. Thus, the estimates in the storage unit 58 constitute a map of the smoothed replica signal 40 in time and/or space, and thereby an map of the estimated signal clutter.

The estimation processor 56 is constructed to generate a current correction signal 40 as a predetermined function of the current replica signal 40 and the estimates stored in the map storage unit 58. The predetermined function may any applicable smoothing or averaging algorithm, such as non-recursive (batch averaging), or recursive (real time) filtering. Exemplary algorithms which are applicable to the present invention further include alpha (exponential) filtering, Kalman or extended Kalman filtering, and morphological filtering. After the correction signal is calculated for a given set of coordinates, it is stored in the map storage unit 58 as the new estimate value.

The controller 38 includes a correction signal generator 60 and further preferably includes a threshold unit 62. The generator 60 generates the correction signal in accordance with the output signal from the estimator 36. The threshold unit 62 prevents input signals IN having dynamic ranges below a predetermined value from being compressed. If, for example, the threshold level in the unit 62 is set to 16 dB, the unit 62 will inhibit the signal generator 60 from generating a correction signal if the dynamic range of the input signal IN is more than 16 dB below the maximum dynamic range of signal IN. Thus, a zero signal will be subtracted from the input signal IN in the subtractor 32, resulting in the input signal propagating through the combiner 22 with nominal or uncompressed dynamic range. Although the signal generator 60 will not generate a correction signal in response to input signals which do not cross the threshold, the corresponding replica signal 40 is applied to the estimator 56 to update the estimate in the map storage unit 58.

The output signal conditioner 42 includes a digital-to-analog D/A converter 64 for converting the correction signal from digital to analog form for subtraction from the input signal IN in the subtractor 32, an amplifier 66 for suitably adjusting the amplitude of the correction signal, and a phase adjuster 68 for fine phase matching of the correction signal 44 to the input signal IN.

Figure 4:
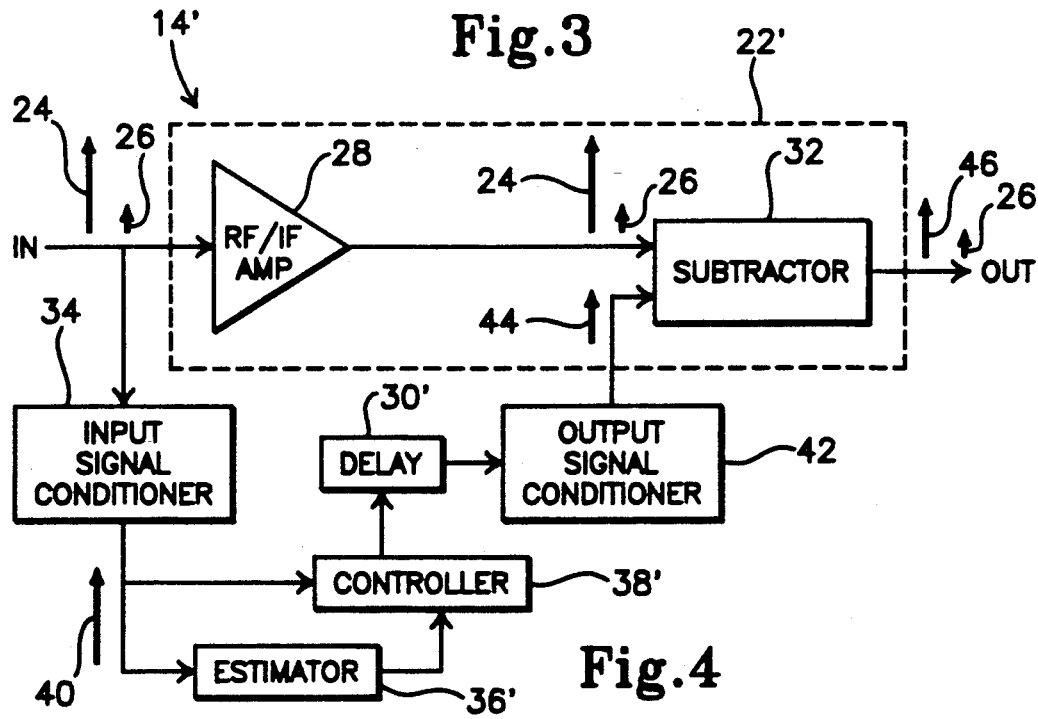
FIG. 4 is a simplified block diagram of a second embodiment of a signal dynamic range compression apparatus embodying the present invention.

FIG. 4 illustrates another signal dynamic range compressor 14' embodying the present invention, in which corresponding but modified elements are designated by the same reference numerals primed. The compressor 14' differs from the compressor 14 in that it is constructed to operate in delayed time, rather than real time. The delay unit 30 is omitted, and a delay unit 30' is provided between a modified controller 38' and the output signal conditioner 42. A modified estimator 36' operates in combination with the controller 38' such that the correction signal 44 is generated in response to a current pulse, but applied to a subsequent pulse. The subsequent pulse may be the pulse immediately following the current pulse, or may separated from the current pulse by a suitable number of subsequent pulses. The delay unit 30' provides a suitable delay such that the phase of the correction signal 44 is matched to the phase of the subsequent pulse from which it is subtracted.

Since the principles of the invention have now been made clear, modifications which are particularly adapted for specific situations without departing from these principles will be apparent to those skilled in the art. The appended claims are intended to cover such modifications as well as the subject matter described and to only be limited by the true spirit and scope of the invention.

What is claimed as new and desired to be secured by Letters Patent of the United States is:

1. A signal compression apparatus for selectively compressing large signal components of a composite input signal, comprising:
   correction signal generator means for coarsely sampling the input signal and generating a correction signal in response thereto having a waveform which approximates only the large signal components of the input signal and an amplitude which is lower than and increases as a predetermined function of the maximum amplitude of the input signal; and
   subtractor means for subtracting the correction signal from the input signal to produce an output signal.

2. An apparatus as in claim 1, in which the generator means is constructed to generate the correction signal in accordance with the predetermined function such that the maximum amplitude of the output signal is always lower than a predetermined value.

3. An apparatus as in claim 1, in which the generator means is constructed to coarsely sample the input signal such that small signal components having amplitudes lower than a predetermined value are ignored.

4. An apparatus as in claim 3, in which the generator means comprises means for digitally sampling the input signal with a minimum resolution corresponding to the predetermined value.

5. An apparatus as in claim 1, in which the generator means further comprises threshold means for inhibiting generation of the correction signal when the sampled amplitude of the input signal is below a predetermined threshold value.

6. An apparatus as in claim 1, in which:
   the input signal comprises recurring pulses; and
   the generator means further comprises:
      mapping means for storing averaged time estimates of the amplitudes of the pulses; and
      estimator means for generating the correction signal as a predetermined function of the sampled input signal and the time estimates.

7. An apparatus as in claim 6, in which the estimator means is further constructed to update the time estimates stored in the mapping means as a predetermined function of a current correction signal.

8. An apparatus as in claim 1, further comprising delay means disposed upstream of the subtractor means for delaying the input signal such that the delayed input signal is equal in phase with the correction signal.

9. An apparatus as in claim 1, further comprising delay means disposed upstream of the subtractor means for delaying the input signal such that the delayed input signal is time-aligned with the correction signal.

10. An apparatus as in claim 1, in which:
    the input signal comprises recurring pulses; and
    the apparatus further comprises delay means disposed between the generator means and the subtractor means for delaying a correction signal corresponding to a previous pulse so as to be equal in phase with a current pulse.

11. An apparatus as in claim 1, in which the generator means is constructed to generate the correction signal in accordance with the predetermined function so as to reduce the large signal components of an input signal which has a first predetermined maximum amplitude such that the corresponding output signal has a second predetermined maximum amplitude which is lower than the first predetermined maximum amplitude.

12. A method of compressing a composite input signal having large and small signal components, comprising the steps of:
    (a) coarsely sampling the input signal to isolate the large signal components; and
    (b) compressing only the large signal components of the input signal to produce an output signal;
    step (b) comprising the substeps of:
    (c) generating a correction signal in response to the sampled input signal having a waveform which approximates only the large signal components of the input signal and an amplitude which is lower than and increases as a predetermined function of the maximum amplitude of the input signal; and
    (d) subtracting the correction signal from the input signal to produce an output signal.

13. A method as in claim 12, in which step (c) comprises generating the correction signal in accordance with the predetermined function such that the maximum amplitude of the output signal is always lower than a predetermined value.

14. A method as in claim 12, in which step (c) further comprises inhibiting generation of the correction signal when the sampled amplitude of the input signal is below a predetermined threshold value.

15. A method as in claim 12, in which:
    the input signal comprises recurring pulses; and
    step (c) comprises the substeps of:
    (e) storing averaged time estimates of the amplitudes of the pulses; and
    (f) generating the correction signal as a predetermined function of the sampled input signal and the time estimates.

16. A method as in claim 15, in which step (c) further comprises the substep of:

(g) updating the time estimates stored in the mapping means as a predetermined function of a current correction signal.

17. A method as in claim 12, further comprising the step of:
(e) delaying the input signal prior to performing step (d) such that the delayed input signal is equal in phase with the correction signal.

18. A method as in claim 12, in which:
the input signal comprises recurring pulses; and
the method further comprises the step, performed between steps (c) and (d), of:
(e) delaying a correction signal corresponding to a previous pulse so as to be equal in phase with a current pulse.

19. A method as in claim 12, in which step (c) further comprises:
generating the correction signal in accordance with the predetermined function so as to reduce the large signal components of an input signal which has a first predetermined maximum amplitude such that the corresponding output signal has a second predetermined maximum amplitude which is lower than the first predetermined maximum amplitude.

20. A method as in claim 12, in which step (a) comprises sampling the input signal such that small signal components having amplitudes lower than a predetermined value are ignored.

21. A method as in claim 20, in which step (a) comprises digitally sampling the input signal with a minimum resolution corresponding to the predetermined value.

* * * * *